United States Patent
Giguere et al.

(10) Patent No.: US 10,640,394 B2
(45) Date of Patent: May 5, 2020

(54) SYSTEMS AND METHODS FOR REMOVING VOLATILE COMPOUNDS FROM WATER-STORAGE TANKS

(71) Applicant: PAX Water Technologies Inc., Richmond, CA (US)

(72) Inventors: Robin Giguere, Piedmont, CA (US); Peter Fiske, Oakland, CA (US); Ethan Brooke, San Anselmo, CA (US)

(73) Assignee: UGSI Solutions, Inc., Poway, CA (US)

( * ) Notice: Subject to any disclaimer, the term of this patent is extended or adjusted under 35 U.S.C. 154(b) by 153 days.

(21) Appl. No.: 15/857,727

(22) Filed: Dec. 29, 2017

(65) Prior Publication Data

US 2018/0186660 A1    Jul. 5, 2018

Related U.S. Application Data

(60) Provisional application No. 62/441,208, filed on Dec. 31, 2016.

(51) Int. Cl.
| | |
|---|---|
| *B01D 53/02* | (2006.01) |
| *C02F 1/20* | (2006.01) |
| *B01D 19/00* | (2006.01) |
| *E03B 11/08* | (2006.01) |
| *C02F 101/32* | (2006.01) |
| *C02F 101/10* | (2006.01) |
| *C02F 101/12* | (2006.01) |
| *C02F 103/06* | (2006.01) |

(52) U.S. Cl.
CPC ............ *C02F 1/20* (2013.01); *B01D 19/0005* (2013.01); *B01D 19/0042* (2013.01); *E03B 11/08* (2013.01); *C02F 2101/101* (2013.01); *C02F 2101/12* (2013.01); *C02F 2101/322* (2013.01); *C02F 2103/06* (2013.01); *C02F 2303/24* (2013.01)

(58) Field of Classification Search
CPC ... B01D 19/0005; B01D 19/0042; C02F 1/20; C02F 2101/101; C02F 2101/102; C02F 2101/322; C02F 2103/06; C02F 2103/24; E03B 11/08
See application file for complete search history.

(56) References Cited

U.S. PATENT DOCUMENTS

| | | |
|---|---|---|
| 4,005,999 A | 2/1977 | Carlson |
| 6,136,204 A | 10/2000 | Krejci |
| 6,495,049 B1 | 12/2002 | Van Esch |
| 7,060,236 B2 | 6/2006 | Yan et al. |
| 9,216,885 B1 | 12/2015 | Harvey et al. |
| 9,272,924 B2 | 3/2016 | Berger et al. |
| 9,816,716 B2 | 11/2017 | Fiske et al. |
| 2012/0267318 A1 | 10/2012 | Hatten |
| 2015/0167993 A1 | 6/2015 | Fiske et al. |
| 2016/0221848 A1 | 8/2016 | Miller et al. |

*Primary Examiner* — Christopher P Jones
(74) *Attorney, Agent, or Firm* — The Webb Law Firm

(57) ABSTRACT

A system for reducing an amount of volatile organic compounds which includes: a water-storage tank having a tank containing water, a roof positioned over the tank, and a headspace region formed between the roof and a surface of the water contained in the tank; an air exchange system positioned at least partially in the headspace region that is configured to exchange air exterior to the tank with air inside the tank; and a water conveyance device located at least partially in the water of the water-storage tank and which is configured to convey water in a manner that produces a surface flow velocity. A method reducing an amount of volatile organic compounds is also included.

13 Claims, 2 Drawing Sheets

SYSTEMS AND METHODS FOR REMOVING VOLATILE COMPOUNDS FROM WATER-STORAGE TANKS

CROSS REFERENCE TO RELATED APPLICATIONS

This application claims the benefit of U.S. Provisional Application No. 62/441,208, filed Dec. 31, 2016, which is incorporated herein by reference in its entirety.

BACKGROUND OF THE INVENTION

Field of the Invention

The present invention is directed to systems and methods for reducing the amount of volatile organic compounds, such as trihalomethanes and other volatile contaminants present in water-storage tanks.

Description of Related Art

Water delivered to humans, animals, and for agricultural uses is expected to be healthful. As such, it is desirable to remove contaminants such as volatile organic compounds ("VOCs") from water systems prior to delivery to the consumers. Removal of such contaminants, especially trace amounts of such contaminants, can be problematic, however.

Moreover, with the increased adoption of secondary disinfection regimes, downstream generation of volatile contaminates can occur in a municipal water supply, even when the water might have substantially lower concentrations of such materials at the time the water left the water treatment facility. By-products of secondary disinfection regimes, namely trihalomethanes ("THMs"), can be generated prior to delivery of the water to a customer. Given the increased potential for volatile materials to occur in water systems today, alternative methods to reduce disinfection by-products in water systems have been proposed.

One method for reducing disinfection by-products is to reduce natural organic matter via treatment processes at the water treatment plant prior to chlorination of a water supply. However, it is not always cost effective to eliminate all natural organic matter in a water supply and, sometimes, the specific configuration of a water system can allow natural organic matter to be introduced downstream of a treatment plant. Water derived from wells or aquifers may also be difficult to treat to remove natural organic matter in the first instance.

Another method for reducing disinfection by-product levels is to reduce or eliminate disinfection by-products that have been formed and that are present in a water supply system prior to delivery of water to a customer. In this regard, aeration has emerged as a method to remove disinfection by-products, as well as other volatile materials in water supplies, while the water is in situ in a distribution system, that is, stored in a water-storage container. Aeration practiced in distribution systems has been shown to be cost effective when compared to making major changes in treatment processes or alternate disinfection practices. Brooke, Ethan and Collins, M. Robin, *Journal—American Water Works Association*, Issue Date: October 2011, vol. 103, No. 10, pgs. 84-96.

Separation of volatile materials via aeration is accomplished by increasing the surface area of the water exposed to air. As applied to water-storage tanks, increased surface area is typically achieved by way of droplet creation. However, aeration can be less effective under certain conditions that are common in water-storage tanks. For example, the efficiency of aeration systems relates to the headspace volume, with reduced headspace volume generally corresponding to reduced efficiency in that aeration systems need both unsaturated air that can accept volatiles from the water and a sufficient distance between the nozzle and the water surface to effect sufficient aeration (droplet creation).

Thus, it is desirable to provide a water system that can sufficiently remove volatile contaminants from water-storage tanks without any of the previously described drawbacks.

SUMMARY OF THE INVENTION

In certain non-limiting embodiments or aspects, the present invention is directed to a system for reducing an amount of volatile organic compounds comprising: a water-storage tank comprising a tank containing water, a roof positioned over the tank, and a headspace region formed between the roof and a surface of the water contained in the tank; an air exchange system positioned at least partially in the headspace region that is configured to exchange air exterior to the tank with air inside the tank; and a water conveyance device located at least partially in the water of the water-storage tank and which is configured to convey water in a manner that produces a surface flow velocity.

In some non-limiting embodiments or aspects, the water conveyance device is configured to convey water to the water surface. Further, the water conveyance device can be configured to exchange water at or toward the floor of the tank with water at or toward the water surface. The water conveyance device can also circulate water around the tank.

In certain non-limiting embodiments or aspects, the water conveyance device is completely submerged in the water when the tank is in use. For instance, the water conveyance device can be attached to or sit on the floor of the tank.

In some non-limiting embodiments or aspects, the air exchange system comprises: (i) a port that enables air to flow out of the water-storage tank; and (ii) an active air ventilation device configured to facilitate movement of air exterior of the water-storage tank into the headspace region. The active air ventilation device can be configured to facilitate the movement of air exterior of the water-storage tank into the headspace region in a direction that is non-perpendicular to the water surface. The active air ventilation device can also be configured to facilitate the movement of air exterior of the water-storage tank into the headspace region substantially across the water surface.

In certain non-limiting embodiments or aspects, the active air ventilation device comprises air vents that fluidly connect the air exterior of the water-storage tank to the headspace region. In such embodiments or aspects, the active air ventilation device can comprise at least one screen that is positioned over at least one of the air vents. In some non-limiting embodiments or aspects, the active air ventilation device comprises an air moving device, such as a fan for example. In certain non-limiting embodiments or aspects, the water conveyance device comprises a mixer having blades, such as an impeller for example.

The present invention also includes a method of removing volatile materials from water stored in a water-storage tank. In certain non-limiting embodiments or aspects, the method comprises: conveying at least a portion of the water stored in the water-storage tank from a location below a surface of the water up to the surface of the water with a water conveyance device; directing air from the exterior of the water-storage tank non-perpendicularly to the surface of the water stored in the water-storage tank with an active air ventilation device; and exchanging the exterior air with air in the interior of the water-storage tank through a port located above the surface of the water, thereby removing at least a portion of volatile organic compounds present in the stored water of the water-storage tank.

In some non-limiting embodiments or aspects, the water conveyance device maintains a chemical gradient between the exterior air and the water such that volatile compounds are transferred from the water to the interior air. The exchanging of the air can comprise operating an air moving device of the active air ventilation device engaged with the water-storage tank to move the exterior air into the water-storage tank in a direction substantially across the surface of the water. Further, in some non-limiting embodiments or aspects, the method does not incorporate an aeration step. In certain non-limiting embodiments or aspects, the stored water contains an amount of volatile chemicals and the method automatically initiates when the amount of volatile chemicals in the stored water exceeds a pre-determined amount. The method can also automatically stop when the amount of volatile chemicals in the stored water drops below the pre-determined amount. The water stored in the water-storage tank can further comprise an initial amount of volatile chemicals and the pre-determined amount is about 5% of the initial amount.

Further non-limiting embodiments or aspects are set forth in the following clauses:

Clause 1: A system for reducing an amount of volatile organic compounds comprising: a water-storage tank comprising a tank containing water, a roof positioned over the tank, and a headspace region formed between the roof and a surface of the water contained in the tank; an air exchange system positioned at least partially in the headspace region that is configured to exchange air exterior to the tank with air inside the tank; and a water conveyance device located at least partially in the water of the water-storage tank and which is configured to convey water in a manner that produces a surface flow velocity.

Clause 2: The system of clause 1, wherein the water conveyance device is configured to convey water to the water surface.

Clause 3: The system of clauses 1 or 2, wherein the tank has a floor and the water conveyance device is configured to exchange water at or toward the floor of the tank with water at or toward the water surface.

Clause 4: The system of any of clauses 1-3, wherein the water conveyance device circulates water around the tank.

Clause 5: The system of any of clauses 1-4, wherein the water conveyance device is completely submerged in the water when the tank is in use.

Clause 6: The system of any of clauses 1-5, wherein the water conveyance device is attached to or sits upon the floor of the tank.

Clause 7: The system of any of clauses 1-6, wherein the air exchange system comprises: (i) a port that enables air to flow out of the water-storage tank; and (ii) an active air ventilation device configured to facilitate movement of air exterior of the water-storage tank into the headspace region.

Clause 8: The system of any of clauses 1-7, wherein the active air ventilation device is configured to facilitate movement of air exterior of the water-storage tank into the headspace region in a direction that is non-perpendicular to the water surface.

Clause 9: The system of any of clauses 1-8, wherein the active air ventilation device is configured to facilitate the movement of air exterior of the water-storage tank into the headspace region substantially across the water surface.

Clause 10: The system of any of clauses 1-9, wherein the active air ventilation device comprises air vents that fluidly connect the air exterior of the water-storage tank to the headspace region.

Clause 11: The system of any of clauses 1-10, wherein the active air ventilation device comprises at least one screen that is positioned over at least one of the air vents.

Clause 12: The system of any of clauses 1-11, wherein the active ventilation device comprises an air moving device.

Clause 13: The system of any of clauses 1-12, wherein the air moving device is a fan.

Clause 14: The system of any of clauses 1-13, wherein the water conveyance device comprises a mixer having blades.

Clause 15: A method of removing volatile materials from water stored in a water-storage tank, comprising: conveying at least a portion of the water stored in the water-storage tank from a location below a surface of the water up to the surface of the water with a water conveyance device; directing air from exterior of the water-storage tank non-perpendicularly to the surface of the water stored in the water-storage tank with an active air ventilation device; and exchanging the exterior air with air in an interior of the water-storage tank through a port located above the surface of the water, thereby removing at least a portion of volatile organic compounds present in the stored water of the water-storage tank.

Clause 16: The method of clause 15, wherein the water conveyance device maintains a chemical gradient between the exterior air and the water such that volatile compounds are transferred from the water to the interior air.

Clause 17: The method of clauses 15 or 16, wherein the exchanging of the air comprises operating an air moving device of the active air ventilation device engaged with the water-storage tank to move the exterior air into the water-storage tank in a direction substantially across the surface of the water.

Clause 18: The method of any of clauses 15-17, wherein the method does not incorporate an aeration step.

Clause 19: The method of any of clauses 15-18, wherein the stored water contains an amount of volatile chemicals and the method automatically initiates when the amount of volatile chemicals in the stored water exceeds a pre-determined amount.

Clause 20: The method of any of clauses 15-19, wherein the method automatically stops when the amount of volatile chemicals in the stored water drops below the pre-determined amount.

Clause 21: The method of any of clauses 15-20, wherein the water stored in the container comprises an initial amount of volatile chemicals and the pre-determined amount is about 5% of the initial amount.

DESCRIPTION OF THE INVENTION

Figure 1:
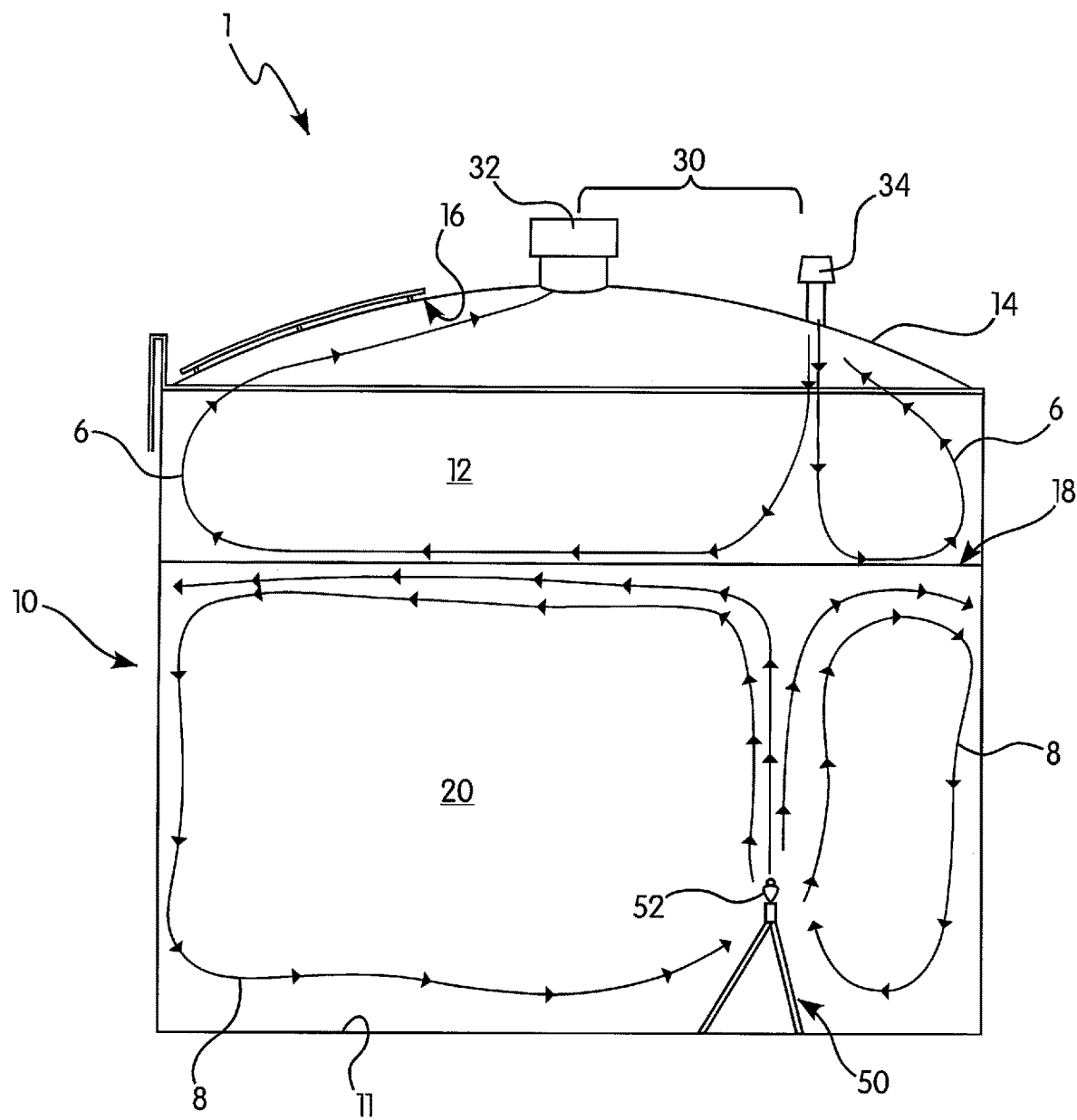
FIG. 1 is a partial front view of a roof portion of a water-storage tank having a VOC removal system according to a non-limiting embodiment of the invention.

For purposes of the following detailed description, it is to be understood that the invention may assume various alternative variations and step sequences, except where expressly specified to the contrary. Moreover, other than in any, operating examples, or where otherwise indicated, all numbers expressing, for example, quantities used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Further, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings; and described in the specification, are simply exemplary embodiments or aspects of the invention. Hence, specific dimensions and other physical characteristics related to the embodiments or aspects disclosed herein are not to be considered as limiting.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "substantially" is meant to permit deviations from the descriptive term that do not negatively impact the intended purpose.

The phrase "volatile chemical" includes VOCs such as chloroform, bromoform, and trichloroethylene (TCE), as well as radon, carbon dioxide, and hydrogen sulfide. Embodiments or aspects according to this disclosure may at least partially remove one, some or all of the volatile chemicals present in the water stored in the water-storage tank regardless of whether the description refers to volatile chemicals generally or certain volatile chemicals specifically. The term "VOCs" as used herein includes VOCs and other volatile chemicals and such terms are used interchangeably herein.

The phrases "water-storage tanks", "water-storage containers" and the like are used interchangeably. In addition, the term "water" when used to describe "water-storage tanks/containers" encompasses both water and compositions comprising water, in which water is the majority of the composition.

The term "community water supply" means a water supply provided from a central point and piped to individual users under pressure. Water sources used to generate municipal water supplies can vary. As required by regulations, municipal water supplies will typically undergo primary disinfection at a treatment facility to make the water suitable for use as potable water or the like. Secondary disinfection with chloramination processes can also be provided at the water treatment plant to ensure that the water will remain suitable for use as it travels through the water distribution system to the consumer.

"Well water" is water obtained from a below-ground water source such as an aquifer, and that is stored (or storable) for supply as potable water, among other uses. As would be recognized, well water can natively comprise free ammonia as a result of natural processes. Well water may be disinfected prior to use, or it may not be.

"Primary disinfectants" are generally intended to kill or otherwise deactivate pathogens that exist in a water source upon its arrival at a treatment plant, whereas "secondary disinfectants" are generally intended to maintain the healthiness and cleanliness of the water supply upon leaving the treatment plant throughout its path through a community water system until it reaches the faucet of a consumer. "Secondary disinfection" may be for the maintenance of free or combined chlorine levels in a water supply once the water is treated with primary disinfecting methods (e.g., sedimentation, coagulation, UV, chlorine gas, etc.).

As indicated, the present invention includes systems and methods for removing or reducing the amount of one or more volatile contaminants from water that is stored in a water-storage tank prior to delivery of such water to a consumer. The stored water can comprise, for example, water that has been treated with secondary disinfection at a water treatment facility, and/or the stored water can comprise another source of water, such as a well or an aquifer. Although the methods and systems herein substantially do not rely on increasing the surface area of the water undergoing decontamination for efficacy, the systems and methods herein may be used together with approaches for removing contaminants, which rely on increasing the surface area of water. The systems and methods generally involve circulating or otherwise conveying stored water within the water-storage tank while also exchanging air outside the tank for air inside the tank.

Without being bound by theory, it is believed that the movement of water coupled with the exchange of interior air with exterior air maintains or increases the chemical potential between the water surface and the air to favor release of volatile chemicals into the air. As used herein, the "chemical potential" refers to the tendency for the chemical to diffuse. In some non-limiting embodiments or aspects, the systems generally comprise a water-storage tank fitted with a device for circulating water in addition to a device for actively circulating air inside the headspace of the water-storage tank and for actively exchanging inside air with outside air (i.e. actively venting air).

Referring to FIG. 1, and in certain non-limiting embodiments or aspects, the present invention includes a system 1 for removing volatile compounds from a water-storage tank 10. The system 1 includes a water-storage tank 10 fitted (or retrofitted) with an air exchange system 30 and a water conveyance device 50. FIG. 1 also illustrates air flow patterns 6 and water flow patterns 8 within the water-storage tank 10 when the air exchange system 30 and water conveyance device 50 are active.

In some non-limiting embodiments or aspects, the water-storage tank 10 is a community water-storage tank 10. Community water-storage tanks typically have a capacity of about 500 gallons of water or greater, or about 1,000 gallons of water or greater, or about 100,000 gallons of water or greater, or about 1,000,000 gallons of water or greater. Water-storage tanks may even have capacities of up to a billion gallons of water. The systems and methods of the present invention are typically for use with large volume water-storage tanks, i.e. water-storage tanks having a volume of about 5,000 gallons or greater. Water-storage tanks can include elevated containers and other substantially enclosed containers in which these large volumes of water can be stored prior to delivery to a customer.

In use, a portion of the capacity of the water-storage tank 10 is "headspace" 12, a region, which does not contain water. The headspace 12 is therefore formed between the interior surface 16 of the roof 14 of the water-storage tank 10 and the surface 18 of a body of water 20 contained in the water-storage tank 10. As used herein, the surface 18 of a body of water 20 is also referred to as the air/water interface. Further, it is appreciated that the volume of headspace 12 fluctuates in relation to the amount of the body of water 20 stored in the water-storage tank 10.

As indicated, the water-storage tank 10 comprises an air exchange system 30 and a water conveyance device 50. The air exchange system 30 circulates air within the headspace region 12 and exchanges air interior to the water-storage tank 10 with air exterior to the water-storage tank 10. Referring to FIG. 1, the air exchange system 30 comprises a port 32 and an active air ventilation device 34, both of which, for example, can be formed through the roof 14 of the water-storage tank 10 and are in fluid communication with the headspace region 12.

In some non-limiting embodiments or aspects, the port 32 is typical of water-storage tanks 10 for which the level of water fluctuates (for example, to prevent de-pressurization and buckling of the water-storage tank 10 structure during draining). It is appreciated that the port 32 enables air to flow out of the water-storage tank 10.

Figure 2:
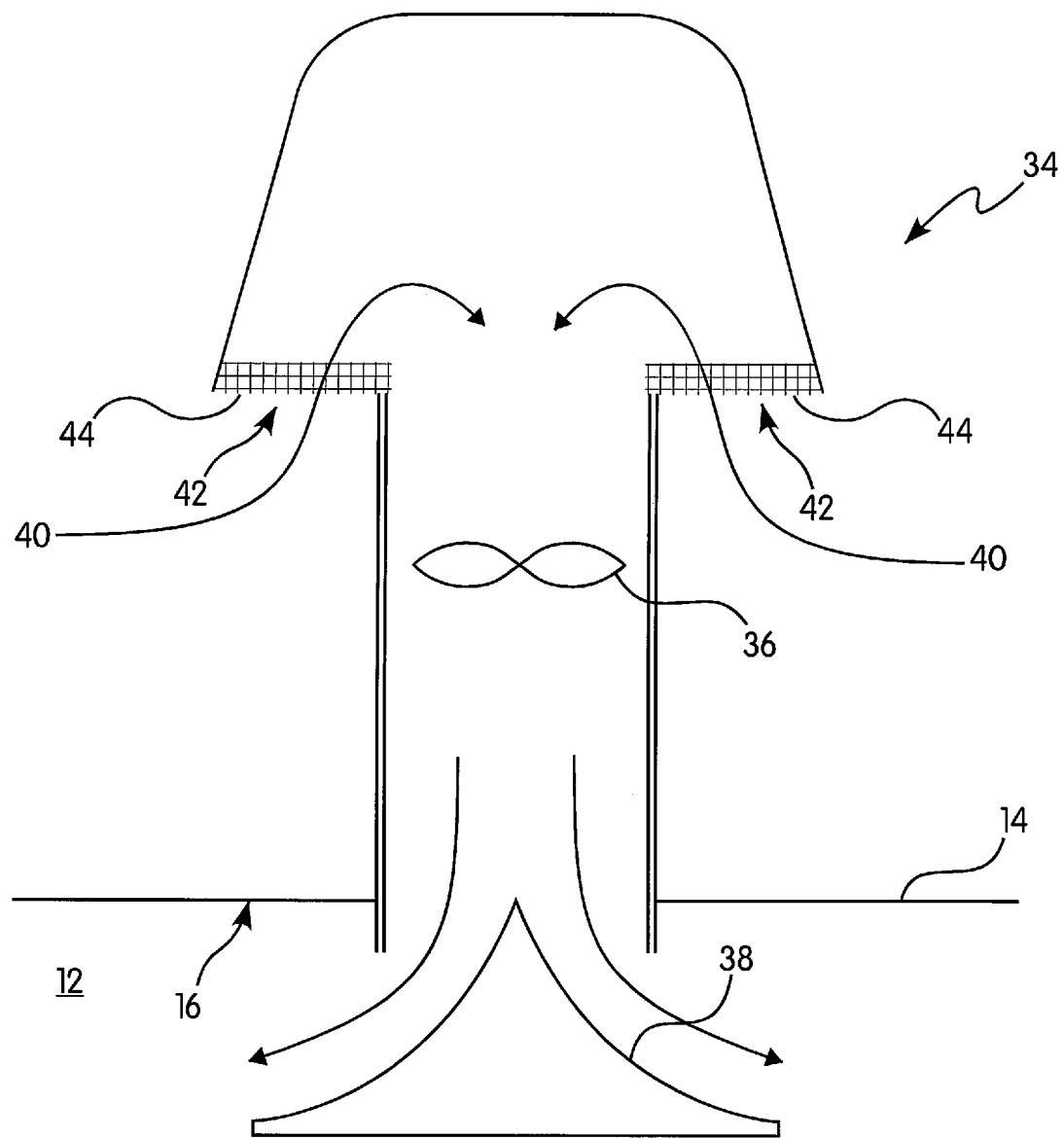
FIG. 2 is a cross-sectional front view of an active air ventilation system of FIG. 1.

As previously described, the air exchange system 30 also comprises an active air ventilation device 34. FIG. 2 further illustrates a non-limiting embodiment of an active air ventilation device 34. As shown in FIG. 2, air movement is provided by a fan or other air moving device 36. Air flow direction through the active air ventilation device 34 may be accomplished by appropriate orientation of the air moving device 36 and/or by using a deflector 38 in fluid communication with the air moving device 36. The use of a deflector 38 may be particularly desirable where the airflow direction is otherwise perpendicular to the water surface, for example to optimize removal of volatile compounds and/or minimize surface water disruptions. As such, the air moving device 36 can influence airflow rate and frequency, and the optional deflector 38 can help influence airflow direction. It is appreciated that the active air ventilation device 34 is configured to facilitate exchange of air exterior 40 to the water-storage tank 10 with air interior to the water-storage tank 10 by fluidly connecting the interior headspace region 12 with the exterior environment by way of vents 42.

To alleviate and/or prevent contamination of water stored within the water-storage tank 10, for example to alleviate or prevent ingress of animals, leaves, and/or other debris into the water-storage tank 10, screens 44 may be provided to cover the vents 42. In addition, and as indicated above, the ventilation device 34 is an "active" air ventilation device 34, and accordingly, provides input energy (e.g. mechanical or electrical) to assist the air exchange process. Referring to FIG. 2, the input energy is provided by the air moving device 36 such as a fan. In some non-limiting embodiments or aspects, for example, where there may be a desire to achieve additional energy savings, a switch may be provided that automatically engages the air moving device 36 when the amount of volatile compounds or volatile compound concentration is above a predetermined amount, and/or automatically disengages the air moving device 36 when the amount of volatile compounds or the volatile compound concentration is below a predetermined amount. In some examples, the water stored in the water-storage tank 10 comprises an initial amount of volatile chemicals and the predetermined amount is about 5% of the initial amount, about 10% of the initial amount, about 15% of the initial amount, or about 20% of the initial amount.

It is appreciated that the air moving device 36 specifications, and the dimensions of the air ventilation device 34, including the relative dimensions of the air ventilation device 34 as compared to the air moving device 36, determine the airflow rate (or range of air flow rates). Also, the angle of the active air ventilation device 34 connected to the water-storage tank 10 relative the surface 18 of the body of water 20 defining the lower boundary of the headspace 12 will also impact air flow direction. Although the active air ventilation device 34 is shown mounted on the roof 14, the active air ventilation device 34 can be connected to other areas of the water-storage tank 10 such as, for example, being ducted from the ground.

In some non-limiting embodiments or aspects, the components that make up the air exchange system 30 can include the devices described in U.S. Pat. No. 9,816,716, filed Dec. 13, 2013, which is hereby incorporated by reference in its entirety.

In general, and without being bound by theory, it is believed that the efficiency of volatile chemical removal will be dependent, in part, on the velocity and direction of air contact at the air/water interface 18. In some non-limiting embodiments or aspects, the active air ventilation device 34 is configured to move air into and around the water-storage tank 10 in a direction and/or velocity that optimizes removal of air laden with contaminants, such as VOCs. For instance, the active air ventilation device 34 can be configured to move air into the water-storage tank 10 in a direction that is non-perpendicular to the water surface 18 defining the boundary of the headspace region 12. In certain non-limiting embodiments or aspects, the active air ventilation device 34 is configured to move air substantially laterally across the interior surface 16 of the roof 14 of the water-storage tank 10. Further, in some non-limiting embodiments or aspects, the active air ventilation device 34 is configured to move air substantially laterally across the water surface 18 defining the boundary of the headspace region 12. In addition, the active air ventilation device 34 can be configured to move air in a direction and/or velocity substantially without generation of sufficient surface waves and/or splashes (hereafter "surface disruptions") to create any appreciable additional surface area at the air/water interface 18. The active air ventilation device 34 is also configured to direct the volatile chemicals away from the water surface 18 and toward the port 32 to facilitate their removal from the water-storage tank 10.

In some non-limiting embodiments or aspects, the air exchange system 30 is configured to achieve a sufficient number of air exchanges/day corresponding to maintaining a desired chemical potential across the air/water interface and a desired rate of removal of VOC. In certain non-limiting embodiments or aspects, the air exchange system 30 is configured to exchange air through the water-storage tank 10 at a rate several times faster than the movement of water in and out of the water-storage tank 10. In some examples, the air exchange system 30 can accomplish at least approximately 5-100 air exchanges/day.

As previously described, and as shown in FIG. 1, the VOC removal system 1 also includes a water conveyance device 50 (also referred to herein as a "mixer") in operational engagement with the body of water 20 in the water-storage tank 10 for moving the water 20 throughout the water-storage tank 10. The conveyance device 50 is configured to move at least a portion of the stored water 20 up to the water surface 18, such that at least some of the conveyed water comes into contact with air that is supplied from the air exchange system 30 forming an air/conveyed water interface.

In some non-limiting embodiments or aspects, the water conveyance device 50 can be substantially immersed below the water surface 18, such that circulation of the water with the conveyance device 50 will substantially not result in the generation of surface disruptions and additional appreciable surface area at the water surface 18. The water conveyance device 50 is also configurable to substantially not generate formation of bubbles at the water surface 18. In certain non-limiting embodiments or aspects, the water conveyance device 50 includes mixing blades 52 (such as an impeller for example) and is maintained at a distance below the surface 18 of the stored water in which the blade(s) 52 of the water conveyance device 50 are fully submerged.

As shown in FIG. 1, the water conveyance device 50 can be located within the water-storage tank 10 so that it is completely submerged in the body of water 20. However, the water conveyance device 50 need not be fully submerged as long as the water conveyance device 50, when in operation, facilitates the movement of the body of water 20 within the water-storage tank 10, preferably without substantially generating surface disruptions and additional appreciable surface area at the water surface 18. In some non-limiting embodiments or aspects, the water conveyance device 50 (or at least the portion of the water conveyance device 50 that may cause surface disruptions and increased water surface area) is fully submerged at least about 36 inches beneath the water surface 18 to reduce or eliminate surface disruptions and increased water surface area. Further, in certain non-limiting embodiments or aspects, the water conveyance device 50 can be configured to exchange water at or toward the floor 11 of the water-storage tank 10 with water at or toward the water surface 18. The water conveyance device 50 can also be attached to or sit upon the floor 11 of the water-storage tank 10.

In some non-limiting embodiments or aspects, the water conveyance device 50 will continuously or substantially continuously convey stored water 20 from below the water surface 18 to the water surface 18 (that is, the air/water interface) when the water conveyance device 50 is operational. In certain non-limiting embodiments or aspects, including the illustrated water flow pattern 8 water of FIG. 1, water is circulated around the tank water-storage 10 in a top to bottom configuration.

Without being bound by theory, it is believed that the efficiency of volatile contaminant removal depends, in part, on the frequency that new air/water interfaces are generated or, put another way, how much turnover of water is created. In some non-limiting embodiments or aspects, the water conveyance device 50 is configured to result in circulating the entire volume of water 20 in the water-storage tank 10 at least once, at least six times, at least 10 times, at least 50 times, or at least 100 times during a fill and drain cycle in the water-storage tank 10. The volatile compound removal may be increased by increasing the circulation rate beyond the set number of exchanges per fill and drain cycle.

The air exchange system 30 and water conveyance device 50 can use a power source for operation thereof. The power source can be provided by any method known in the art. For example, the power source can be provided by connection of the water-storage tank 10 to a power grid. Yet further, the water-storage tank 10 can be powered by batteries. Still further, power can be provided by solar panels. In addition, the power for the system may be supplied by water pressure present in the distribution system, or by pumps.

In operation, the air exchange system 30 and the water conveyance device 50 cooperate to exhaust at least a portion of the VOCs present in the stored water 20 to the outside air. Without wishing to be bound by theory, it is believed that the air exchange system 30 and the water conveyance device 50 cooperate to maintain a chemical gradient between the air and the water. More specifically, the water conveyance device 50 and air exchange system 30 cooperate to maintain a concentration difference between the water and the air of the constituent to be removed such that there is a chemical potential between the water and the air that favors the transport of the constituent out of the water and into the air.

Thus, for example, in operation, the air exchange system 30 and the water conveyance device 50 produce toroidal air flow and water flow patterns 6,8 respectively. Depending on the 3D geometry, the flow patterns may be concurrent, oblique or counter-current (depending on where the axis of each flow is located and reference point of view). Referring to FIG. 1, and when shown in cross-section, the air and water flow patterns 6, 8 are counter-current to each other (e.g. the air flow pattern 6 is clockwise through the headspace 12, whereas the water flow pattern 8 is counterclockwise around the water-storage tank 10) resulting in air and water flow 6, 8 in the same direction at the air/water interface 18.

As further shown in the air flow pattern 6 of FIG. 1, the air exchange system 30 conveys a source of air having a relatively low content of VOCs (i.e. a lower content than the air inside the water-storage tank 10, or inside the water-storage tank 10 at the air/water interface 18), for example outside air 40, into the water-storage tank 10 via the active air ventilation device 34, across the surface of water 18 and back out through the port 32. In some non-limiting embodiments or aspects, air can also be exhausted to the exterior through the active air ventilation device 34. In this way, air inside the water-storage tank 10 having a relatively higher VOC concentration, for example at the air/water interface 18, is removed from the water-storage tank 10 and replaced with air, for example exterior air 40, having a relatively lower concentration of VOCs.

Similarly, and as also shown in the water flow pattern 8 of FIG. 1, the water conveyance device 50 circulates water from beneath the water surface 18, for example from the bottom of the water-storage tank 10, across the water surface 18 and back down beneath the water surface 18 (e.g. back down to the bottom of the water-storage tank 10). In this way, water having a relatively lower concentration of VOCs (due to the VOCs moving out of the water into the air as a result of the chemical potential difference), for example, water at the air/water interface 18, is replaced with water, for example water at the bottom of the water-storage tank 10, having a relatively higher concentration of VOCs.

Referring to FIG. 1, which includes an exhaust port 32, volatile chemicals present in the headspace region 12 are desirably removed therefrom, so as to prevent the volatile chemicals from being reintegrated into the stored water 20, as well as to reduce the possibility that the headspace region 12 becomes saturated with the volatile chemicals. In some non-limiting embodiments or aspects, saturation of the headspace region 12 can reduce the ability for additional volatile chemicals to be efficiently removed from the stored water 20. Thus, it can be desirable to remove volatile chemicals from the headspace region 12 after such volatile chemicals are removed from the stored water 20. In this regard, the at least one exhaust port 32 is operational to convey air in the headspace region 12 to a location outside of the water-storage tank 10.

In certain non-limiting embodiments or aspects, the air application step will substantially not result in an increase in the surface area of the water, as is the intention of existing methodologies whereby volatile materials are removed from water via prior art air stripping methods used to remove volatile materials from water. In this regard, when the water-storage tank 10 is circular in cross-section, the conveyed water portion has a conveyed water portion surface area defined by the equation: $A=\pi r^2$, wherein r is a water-storage tank 10 interior radius defined by ½ of the diameter of a top surface of the stored water 20. Further, the surface area of the conveyed water present at the air/water interface 18 when air is being applied thereto is substantially equivalent to the surface area of the air/water interface 18 when no air is being applied thereto, where the volume of the stored water 20 is equivalent before and during air application. In other words, for an equivalent volume of water that has the same radius defined by the portion of the water-storage tank 10 that the interface 18 meets, the amount of surface water 18 that is in contact with the headspace region 12 will be substantially the same.

It is appreciated that the air exchange system 30 and water conveyance device 50 are not limited to the specific illustrated embodiments or aspects described herein. For example, they are not limited to an active air ventilation device 34 that moves outside air 40 across the surface of the water or to a water conveyance device 50 that circulates water from the bottom of the water-storage tank 10 across the water surface and back. Other air exchange systems 30 and water conveyance devices 50 which can facilitate maintaining a chemical potential between the water and the air that favors transport of one or more volatile chemicals out of the water and into the air is within scope of the present invention. Thus, for example, included within the scope of this disclosure are other water conveyance devices 50 that will continuously, or substantially continuously, refresh the water at the air/water interface 18 by recirculation, thereby providing new air/water interfaces 18, and other air exchange systems 30 that will act to remove or reduce the amount of volatile chemicals present at or near the air/water interface 18.

Even in instances where very little volatile chemicals are likely present each time a new volume of conveyed water having a concentration of volatile chemicals comes into contact with air having a lower concentration of volatile contaminants at the air/water interface 18, at least some of the volatiles will be removed at any one time. As the water continues to be exchanged, for example re-circulated, in the water-storage tank 10, water with increased concentration of volatile chemicals may be presented at the air/water interface 18 relative to the water it replaced, thus providing additional contact with the exchanged/refreshed air having a lower concentration of volatile compounds than the air it replaced and the new water it contacts at the air/water interface 18, which, in turn, will result in further removal of volatile chemicals from the water supply. Over time, a substantial volume of the stored water in the water-storage tank 10 will have the opportunity to come into contact with the supplied air, thus resulting in a low concentration of volatile chemicals in the water-storage tank 10, as compared to a stored water supply 20 from the same source that is not subjected to the methodology described herein.

In certain non-limiting embodiments or aspects, the inventive methodology provides a level of volatiles chemicals in the stored water supply 20 that is about 1% less, or about 5% less, or about 10% less, or even up to about 50%, 55%, 60%, 65%, and 68% less than a stored water supply 20 that is not subjected to the methodology described herein. The amount of volatile chemical reduction can depend on the cross-sectional size of the water-storage tank 10 at the air/water interface 18 and detention time.

In some non-limiting embodiments or aspects, the systems and methods herein provide significant benefits over other existing volatile chemical removal methodologies. For example, the inventive methodology utilizes substantially less energy than aeration volatile removal technologies. Since water-storage tanks 10 are often in locations where it is difficult to provide a continuous source of power, the low energy aspect of the present invention is an improvement. As another example, the inventive systems and methods substantially reduce the amount of air introduced into the water, with an attendant reduction in the possibility that dissolved gases resulting from vigorous aeration (as is required to generate satisfactory volatile removal) will affect the pH and/or alkalinity of the water.

Whereas particular embodiments or aspects of this invention have been described above for purposes of illustration, it will be evident to those skilled in the art that numerous variations of the details of the present invention may be made without departing from the invention as defined in the appended claims.

The invention claimed is:

1. A system for reducing an amount of volatile organic compounds comprising:
 a water-storage tank comprising a tank containing water, a roof positioned over the tank, and a headspace region formed between the roof and a surface of the water contained in the tank;
 an air exchange system positioned at least partially in the headspace region that is configured to exchange air exterior to the tank with air inside the tank; and
 a water conveyance device located at least partially in the water of the water-storage tank and which is configured to convey water in a manner that produces a surface flow velocity,
 wherein the air exchange system comprises: (i) a port that enables air to flow out of the water-storage tank; and (ii) an active air ventilation device configured to facilitate movement of air exterior of the water-storage tank into the headspace region, and
 wherein the active air ventilation device is attached to the roof of the water-storage tank such that exterior air exits the active air ventilation device directly into the headspace region that is above the surface of the water.

2. The system of claim 1, wherein the water conveyance device is configured to convey water to the water surface.

3. The system of claim 1, wherein the tank has a floor and the water conveyance device is configured to exchange water at or toward the floor of the tank with water at or toward the water surface.

4. The system of claim 3, wherein the water conveyance device circulates water around the tank.

5. The system of claim 1, wherein the water conveyance device is completely submerged in the water when the tank is in use.

6. The system of claim 3, wherein the water conveyance device is attached to or sits upon the floor of the tank.

7. The system of claim 1, wherein the active air ventilation device is configured to facilitate the movement of air exterior of the water-storage tank into the headspace region in a direction that is non-perpendicular to the water surface.

8. The system of claim 1, wherein the active air ventilation device is configured to facilitate the movement of air exterior of the water-storage tank into the headspace region substantially across the water surface.

9. The system of claim 1, wherein the active air ventilation device comprises air vents that fluidly connect the air exterior of the water-storage tank to the headspace region.

10. The system of claim 9, wherein the active air ventilation device comprises at least one screen that is positioned over at least one of the air vents.

11. The system of claim 1, wherein the active air ventilation device comprises an air moving device.

12. The system of claim 11, wherein the air moving device is a fan.

13. The system of claim 1, wherein the water conveyance device comprises a mixer having blades.

\* \* \* \* \*